United States Patent Office 3,794,482
Patented Feb. 26, 1974

3,794,482
CARBOTHERMIC REDUCTION METHOD FOR CONVERTING METAL OXIDES TO METAL FORM
Robert N. Anderson, Palo Alto, and Norman A. D. Parlee, Los Altos Hills, Calif., assignors to Parlee Anderson Corporation, San Mateo County, Calif.
Continuation-in-part of abandoned application Ser. No. 851,299, Aug. 19, 1969. This application Feb. 5, 1971, Ser. No. 113,036
Int. Cl. C22b 21/02, 29/00, 35/00
U.S. Cl. 75—84.1 R                                24 Claims

ABSTRACT OF THE DISCLOSURE

A carbothermic reduction method wherein oxides of chemically reactive metals such as titanium, uranium, aluminum and boron are reacted with carbon in a molten metal solvent with the resultant production of carbon monoxide gas and of free metal which is present in solution in said solvent. In one embodiment, said carbothermic reduction takes place under an atmosphere of nitrogen gas whereby the metal oxide is converted to a solid metal nitride which, in the presence of the molten metal solvent, may thereafter be converted to a solution of the pure metal in said solvent as nitrogen pressures over the system are reduced.

The pure metal going into solution as derived from either the oxide or the nitride can be recovered from the solution by various phase separation methods, including those wherein the metal to be recovered or the solvent metal is distilled off or a liquid-liquid phase separation method is practiced. Furthermore, a phase separation may be accomplished by lowering the temperature of the system until the reactive metal precipitates but while the solvent is still in liquid form.

CROSS-REFERENCE TO RELATED APPLICATION

The present application is a continuation-in-part of an application of the same title, Ser. No. 851,299, filed on Aug. 19, 1969, now abandoned.

BACKGROUND OF THE INVENTION

Carbothermic reduction methods for converting oxides of reactive metals to the corresponding metal form are known. However, they often have little commercial value since the product obtained may be a mixture of the free metal with metal oxides and carbides, and it is uneconomic to separate the metal component of such mixtures from the residue thereof. It is an object of this invention to provide an economically attractive carbothermic reduction method for converting metal oxides in good yields to the metal form without the attendant formation of metal carbides, oxycarbides and other undesired products, and for recovering said metals in essentially pure form from the resulting reaction mixture.

SUMMARY OF THE INVENTION

It has been discovered that the disadvantages of previously known carbothermic reduction methods can be overcome by conducting the reaction between carbon and oxides of reactive metals (see Equation 1 below) in a bath of a molten solvent metal having the ability to reduce the activity of the metal formed during the reaction (and which is present in solution in the molten solvent) to a level below that at which the metal will significantly react with carbon to form a carbide. Tin, copper and iron are the preferred solvent metals for this purpose, each being particularly well adapted for use with a given formed metal, or group of metals, as hereinafter described. Various other metals can be employed either as such or in the form of alloys. More specifically, the system employed should be of such a character that the formed metal present in the solution has an activity under the prevailing conditions of temperature and concentration which is below the activity level at which said metal, present in a pure state, will react with carbon at said temperatures to form the corresponding metal carbide. Further, the reaction is conducted under such conditions that the partial pressure of carbon monoxide over the molten bath is less than the theoretical equilibrium level as calculated from free energy and equilibrium constant values for the particular reaction involved (see Equations 1 and 2 below) in order that the reaction may be caused to go to completion. The CO partial pressures can be maintained at the desired levels by conventional methods such as pulling a vacuum on the system or by sweeping the solution with an inert gas. Preferably, a gas such as argon having a low heat conductivity is employed for this purpose. At those relatively high temperatures where nitrides of the formed metal would decompose, nitrogen gas will also serve the CO-sweeping purpose.

In another embodiment thereof, the reaction of the present invention can also be practiced by incorporating a metal nitride forming stage in the operating sequence. When operating in this manner, the desired partial pressure of nitrogen is maintained over the system as the metal oxide reacts with carbon in the molten solvent. The overall equation for the reaction is shown below in Equation 2. Any nitrogen gas employed in this fashion can also serve, either alone or in conjunction with an inert gas such as argon, to sweep the CO from the system as fast as it is formed, thereby establishing the desired CO partial pressure. This solvent-assisted reaction results in the formation from the oxide of a solid nitride product which is substantially free of significant contamination by oxides, carbides or other impurities. If desired, this solid product can be separated as such from the molten metal solvent and thus from any other materials (such as contaminants in the metal oxide feed employed) which may be present in the reaction mixture. Such separated nitride products have utility as abrasives, as steel alloying ingredients, and for other purposes, and hence they can be employed as such. However, the nitride-forming reaction is readily reversible when conducted in the molten metal solvent in the sense that by reducing the nitrogen partial pressure over the system to appropriately low levels, the nitride compound can be decomposed with consequent evolution of nitrogen gas and the formation of a solution of the residual metal in the tin or other molten solvent metal employed. (See Equation 3 below). This reduction in nitrogen partial pressure over the system can be effected either by pulling a vacuum therein or by sweeping the space with an inert gas.

In addition to providing a method by which the solution of metal in the molten metal solvent can be freed of contaminants (by separating the solid nitride compounds from the reaction mixture and then adding the nitride to a clean bath of the molten solvent metal, which process of nitride resolution and formation can be repeated, if desired), the introduction into the process hereof of the nitride-forming step has other advantages with certain metal oxide starting materials. Thus, the use of nitrogen with resultant formation of the nitride enhances the thermodynamics of the carbothermic reduction, for by this practice deoxidation reactions with large positive free energies are changed to those having negative free energy values. The metal oxides which particularly benefit in this particular are set forth in the discussion presented hereinafter regarding appropriate oxide starting materials.

However the solution of the desired metal in the molten solvent solution is formed, the metal can be recovered as such by a practice of known separation methods. In one such method, the tin or other solvent metal empolyed can be distilled from the solution by electron beam heating, for example, leaving the desired metal as residue. When the electron beam heating method is employed, the operation is conducted in vacuo. In other methods, liquid-liquid phase separation methods can be empolyed, and still further methods will be set forth hereinafter.

When the process of the invention is conducted in the molten solvent bath below an atomsphere which is free of nitrogen, the reaction which takes place in the molten metal solution can be essentially as follows:

$$MO(s) + 2C(s) = 2CO(g) + \underline{M} \qquad (1)$$

or, more generally, as $$M_xO_y(s) + yC(s) = x\underline{M} + yCO(g) \qquad (1a)$$

In the above and other equations employed herein, M represents the metal to be recovered, $\underline{M}$ represents said metal in a dissolved state and (s) and (g) represent solid and gaseous components respectively. The letter (1), where employed, refers to a liquid component.

When the reaction is conducted in the presence of a nitrogen-containing atmosphere, the overall reaction which takes place in the solution can be represented as follows:

$$MO_2(s) + 2C(s) + \tfrac{1}{2}N_2(g) = MN(s) + 2CO(g) \qquad (2)$$

Similarly, this reaction can be expressed generically in the fashion of (1a) above, if desired.

It should also be noted that, along with the CO produced in Equations 1, 1a and 2 above, small amounts of $CO_2$ may also be produced in the case of certain metal oxides. However, this does not affect the overall reaction with which the invention is concerned.

As indicated above, the system containing the solid MN product can be worked up by any one of several methods so as to convert the solid MN product to dissolved metal and gaseous nitrogen components. Thus, the conversion can be effected using either the original reaction mixture or a mixture obtained by separating out the solid MN product and adding it to a fresh, clean bath of the molten solvent metal. The reaction which takes place can be represented as follows:

$$MN(s) = \underline{M} + \tfrac{1}{2}N_2(g)$$

Another phase separation technique for removing the reactive metal from the solvent, particularly adapted for a system in which titanium is the reactive product, includes hydride formation. TiH is formed under a hydrogen atmosphere at a hydride stable temperature. The TiH floats on the solvent and may be skimmed off.

Another phase separation technique, for a system of aluminum as the reactive metal and tin as the solvent, merely involves cooling the melt to a temperature at which the aluminum precipitates while the tin is still in liquid form.

The reaction of the present invention is conducted at elevated temperatures ranging from about 600° to 2300° K., the particular temperature chosen being such as to maintain the metal solvent in the desired liquid state and to provide the desired concentration in the solution of the metal formed from the oxide during the reaction which can range upwardly from about 1 percent to 50 percent or more. Further, as known to those skilled in the art, the temperature of the solution influences the activity of said metal as well as its nitride- and carbide-forming characteristics. The selection of the metal concentration to be employed and, to a certain extent at least, of the operating temperatures, is determined by economic factors. Thus, preferred working levels for the metal concentration in the molten solvent fall in a range of about 3 to 40 percent by weight, while a preferred temperature range is from about 1000° to 2000° K.

The heat necessary to maintain the various stages of the process and the items of equipment employed therewith at the desired temperatures can be supplied by conventional means, such, for example, as by the use of electrical induction heaters. When the latter are employed about graphite pipes or reactor vessels (which are conductive and thus become heated per se), care should be taken to protect the external graphite surfaces against contact with the atmosphere. For this purpose, the graphite apparatus can be shielded with a refractory barrier material such as mica or alumina which preferably is nonconductive so as to prevent shortening of the current as the barrier material comes into contact with any work coils. The coils of the heater can also be exteriorly wrapped with a thermally insulating material so as to conserve heat and protect workmen against being burned as they make contact with the heater.

In operation, the process of the present invention uses a molten bath of a solvent metal (e.g., tin) to which are fed the metal oxides along with carbon in such (stoichimetric) amounts as to at least react with the oxygen component of the oxide to convert the same to carbon monoxide. Preferably, the carbon is added in moderate excess, e.g., 0.1 to 10 percent, above this stoichiometric requirement. For operations conducted on a small scale or when working with extremely valuable metal oxides, it is economically feasible to supply the required carbon reactant by way of a graphite crucible employed to contain the reaction mixture, the crucible thus being eaten away as the reaction progresses. However, inasmuch as the process consumes relatively large amounts of carbon (e.g., 0.1 lb. per pound of uranium processed and 0.5 lb. per pound of titanium), most commercial operations will require that the carbon be added separately. Any form of carbon can be employed for this purpose. Useful for this purpose are oil furrnace, gas furnace and acetylene blacks, lampblacks, charcoal, coke and ordinary graphite particles. Also suitable are such carbon source materials as petroleum gases, wood products and the like. It is also practical to add the carbon in the form of a graphite rod or open cylinder which is merely lowered into the reaction bath. This mode permits of the use of excess carbon without at the same time engendering contamination of the mixture with excess carbon particles; moreover, addition of carbon in this manner results in a more rapid reaction rate.

To contain the various molten metal solutions employed in a practice of this invention, graphite is the preferred material particularly when working with a uranium oxide feed, and it can be employed with tin, copper or iron as the solvent metal, for example. Other inert, refractory materials can be employed to fabricate the container vessels, as well as the various pipes, fittings and other items of hardware associated therewith. Thus, with tin as the solvent one may use such refractory materials as boron nitride and beryllium nitride. With copper as the solvent metal, one may use tungsten for the containment. Instead of using an extraneous refractory containment system, as herein described, it is also possible to contain the molten solvent metal in a so-called "skull" prepared by continuously chilling the exterior portions of the molten metal system to below the solidification temperature thereof, while maintaining the inner portions of the system in the desired molten state.

Heat is supplied to the unit, as indicated above, as required, using induction, electron beam heating or other heating methods, so as to maintain both the reactor vessel and any distillation units employed to drive off the solvent metal at the required temperatures. Steps are taken as the reaction progresses, either by drawing a vacuum over the reaction mixture or by sweeping the space with an inert gas (or, in the case of nitride-forming reaction, with nitrogen or nitrogen plus inert gas) to maintain the partial CO pressure below the equilibrium value, thereby promoting the reaction and causing it to go to completion. Establishing a vacuum over the system is also helpful during the initial recovery stage when the tin or other solvent metal is being distilled away from the metal dissolved. The process can be conducted in either batch form or continuously. In the latter case, portions of the liquid reaction mixture can be continuously withdrawn from the system for separation of the solvent and dissolved metal components, with the separated solvent metal then being returned to the reactor as new increments of metal oxide and carbon feed stocks are supplied thereto. In the case of batch operation the separation of the dissolved metal from the solvent metal can be effected either in the reactor vessel per se or in another vessel.

Depending on the metal employed as the solvent, the method of this invention has utility with the oxides of a wide variety of reacting metals, the term "reactive" here being employed to designate those metals, particularly as recited herein, which react readily with carbon to form the corresponding metal carbides. Thus, when using tin as a solvent, the invention can be practiced to good effect using as feeds the oxides of the reactive metals niobium, tantalum, plutonium, uranium, zirconium, hafnium, titanium, and boron, magnesium, chromium, manganese vanadium, silicon, aluminum. When using copper or iron as the solvent, one may employ oxides of boron as beryllium. Copper is also a suitable solvent for titanium oxide. When using an oxide of a given metal which is contaminated with compounds of other metals, it is proposed that the reaction hereof proceed through the nitride forming stage since this embodiment offers the opportunity in most instances to separate out a nitride of the desired metal which is relatively free of other components. Thus, those impurities which are present in but a small percentage tend to remain in solution in the molten solvent, while the desired metal, present in much larger amounts, forms a nitride which either sinks, e.g., uranium nitride or hafnium nitride, or floats on the melt. Typical floating nitrides are those of titanium, aluminum and zirconium. These specific gravity differences between the nitrides obviously form another convenient method for separating the several metals which may be present in the oxide feed.

Assuming, however, the use of a metal oxide feed of acceptable purity, the process is preferably conducted without the use of a nitride-forming step when employing oxides of the metals boron, titanium, chromium, manganese, vanadium, silicon, aluminum inasmuch as the deoxidation reactions (reaction (1), above) with oxides of these metals have acceptable standard free energy values such that the reaction can be driven forward at reasonable temperatures and pressures. On the other hand, in the case of deoxidation reactions with large positive free energies such as those involving the oxides of niobium, tantalum, plutonium, uranium, zirconium and hafnium, the process is preferably conductive in the presence of nitrogen gas to form the corresponding metal nitride as either a final or an intermediate product. In this reaction (which is reaction (2), above) the free energies involved using these metal oxides are changed to small positive values or to negative values. The formation of the nitride shifts the free energy of the reaction so that again the reaction can be driven forward at reasonable temperatures and pressures.

A requirement for the molten solvent metal or alloy thereof to be employed herein is that the metal have good solubility for the uranium, titanium or other metal which is added in the oxide form. Further, inasmuch as the use of a nitrogen atmosphere forms a part of the present invention in one embodiment thereof, it is also important that the solvent metal does not itself readily form nitrides. Generally, for very stable oxides, it is desirable that the solvent metal have a tendency at lower temperaturs to form stable inter-metallic compounds with the oxide-drived metal present in solution in order that the activity of said metal when in solution may be reduced to a relatively low level such that it does not react with the carbon to form carbides under the conditions employed in carrying out the process. This ability of a given solvent metal to form such intermetallic compounds at low temperatures appears to equate or correlate with the ability of the solvent metal to reduce the activity of the metal dissolved therein even at much higher temperatures. The metals which possess these properties to a greater or lesser degree include lead, zinc, bismuth, cadmium, silver, copper, iron and tin, as well as various alloys of said metals including tin-lead, tin-bismuth, tin-lead-bismuth, tin-cadmium and cadmium-lead. However, of these metals, tin (or a tin alloy) is often preferred since for some systems it best fulfills all the solvent metal requirements as set forth herein. Further, tin has the added advantage that it remains molten over an extremely wide range of from about 505–2960° K. and thus permits the process to be employed even at relatively high temperatures without having to pressurize the system to prevent vapor loss. Similarly, a system can be run at relatively high temperatures or at low pressure without loss of tin, though distillation of this metal from the system becomes readily possible at appropriately high temperatures, particularly when conducted in vacuo. Thus, while tin distills at about 2960° K. at atmospheric pressure, the distillation temperature is reduced to about 1700° K. at 0.115 mm. Hg.

Due to the attractive characteristics of tin, by which term it is meant to include essentially pure tin together with alloys thereof containing at least 50 percent by weight of this metal, as well as in the interests of simplicity and clarity of expression, the present invention will hereinafter be described in its preferred embodiments wherein essentially pure tin is employed as the molten solvent metal.

In carrying out the reaction whereby the carbon reacts with the metal oxide to for mthe pure dissolved meal or the metal nitride, the reaction is forced in the desired direction by maintaining the CO partial pressure below the equilibrium levels which prevail for ag iven system. In general, this CO pressure threshold becomes higher (i.e., less restrictive) with higher solution temperatures and vice versa. Further, the greater the activity of the metal which is present in solution, the lower the CO partial pressure threshold becomes; in other words, thec arbon monoxide partial pressrue over the system must be maintained at increasingly lower values as the metal activity increases. The procedure for determining this CO threshold value for any given system is known to those skilled in the art, and the salient features of the determination are presented hereinafter in connection with the discussion of metal activity.

It is essential that the activity of the metal derived from the oxide and present in solution in the molten tin or other solvent metal, at any given temperature and concentration, have a value which is below the activity at which the particular metal tends to react with carbon present in the system to form a carbide. This latter value is a function of temperature, increasing therewith, though not of the concentration of the metal in solution. On the other hand, that activity of the dissolved metal which must be mainained below the carbide-forming activity threshold increases with both temperature and concentration. The inability to keep this metal activity low while still operating in an efficient and economic manner (i.e., at relatively high concentrations and without carbide formation) has been the chief stumbling block of the hitherto available carbothermic reduction processes. The present invention accordingly rests in large part on the discovery that by carrying out the reaction in a molten tin or other appropriate molten solvent, the metal going into solution in the bath will possess a low activity which is below the carbide-forming activity threshold even at relatively high concentrations of the metal in the metal solvent bath and at high temperatures. At the same time, the corollary benefit of raising the carbon monoxide partial pressure threshold to acceptable working levels is also obtained as the solution method hereof is employed to reduce metal activity.

DETERMINATION OF METAL ACTIVITY

A method for determining the activity of the liquid metal formed during the process of this invention which is present in solution in the molten bath can be illustrated using the metal oxide-forming reaction. The activity so determined will be characteristic of a given system whether or not a certain amount of the free metal formed during the carbothermic reduction step is simultaneously converted to insoluble metal nitride inasmuch as a certain equilibrium percentage of the formed metal will normally remain in solution in the molten tin bath. The equation for the metal oxide-forming reaction is, in one representative embodiment, $$M(l) + O_2(g) = MO_2(s) \tag{4}$$

wherein (l), (g) and (s) represent components which are present in the liquid, gaseous, or solid states, respectively. The equilibrium constant ($K_4$) for reaction (4) above finds expression in the following equation:

$\Delta G° = -RT \ln K_4$ or, expressed otherwise, $$\log K_4 = \frac{-\Delta G°}{4.575T}$$

wherein $\Delta G°$ = net change in free energy in the standard oxide-forming equation (oxygen at 1 atm.) at a particular temperature, R = the gas constant, 1.987, and T = temperature in °K. All logs employed herein except for $\ln$, are to the base 10.

Typical oxide $\Delta G°$ values are given in the literature for each of the metals with which this invention is concerned, and from such data the value of $K_4$ can be determined using the above equation. (Thermodynamic Properties of 65 Elements—Their Oxides, Halides, Carbides and Nitrides. Wicks and Block, U.S. Bureau of Mines Bulletin No. 605 (1963). U.S. Government Printing Office, $1.00.) Experimental data can be obtained in which one determines the $O_2$ gas partial pressure (in atmospheres) which exists over a system comprising a solution of the metal ($\underline{M}$) of given concentration in a solvent metal as the oxide just begins to form at the temperature represented by the $\Delta G°$ value obtained from the literature. This determined $O_2$ partial pressure is then compared with that which exists over the pure liquid metal (M(l)) at the same temperature as it is just caused to be converted to oxide form. This latter, pure metal $O_2$ partial pressure is determined by the equation:

$$K_4 = \frac{a_{MO_2}}{a_{M(l)} \cdot p_{O_2}}$$

wherein $P_{O_2}$ represents equilibrium partial pressure of oxygen in atmospheres over M(l). Since the activity of the $MO_2$ compound ($a_{MO_2}$) and that of the pure liquid metal ($a_{M(l)}$) each have a value of 1, then $$K_4 = \frac{1}{p_{O_2}}$$

and since the value of $K_4$ has already been determined above, the value of $p_{O_2}$ is apparent. The activity of the dissolved metal ($a_{\underline{M}}$) at the particular concentration and temperature employed can then be determined by solving the following equation:

$$a_{\underline{M}} = \frac{p_{O_2} \text{ of } M(l),}{p_{O_2} \text{ of } \underline{M}}$$

thereby obtaining the desired activity value.

Having in mind the requirement that the activity of $\underline{M}$ must be less than that which would lead to metal carbide (MC) formation as the $MO_2$ and C are brought together in the molten solvent (either with or without an atmosphere of nitrogen), the activity level of M must be determined for the following equation:

$$M + C(s) = MC(s) \tag{5}$$

For the purpose one again employs the equation:

$$\Delta G° = -RT \ln K_5$$

The carbide value of $\Delta G°$ at given temperature is available in the foresaid reference for each of the metals with which the present invention is concerned, and thus the value of $K_5$ can then be determined. One then turns to the expression:

$$K_5 = \frac{a_{MC(s)}}{a_{\underline{M}} \cdot a_{C(s)}}$$

and inasmuch as the activity of the metal carbide ($a_{MC}$) and that of carbon ($a_C$) each have a value of 1, then $$K_5 = \frac{1}{a_{\underline{M}}}$$

and the desired value of $a_{\underline{M}}$ at a given temperature in the carbide-forming reaction is readily obtained. Should it now appear that the previously established activity level of $\underline{M}$ falls above or unduly close to the carbide-forming activity threshold as determined above, one may resort to appropriately lower concentrations of $\underline{M}$ to bring the activity thereof down to a satisfactory working level. Moreover, changing reaction temperatures will also be of assistance in changing the activity level of $\underline{M}$ in the desired degree, though lowering of temperature will also lower the carbide-forming activity level in some measure, as well.

The carbothermic reduction reaction of the present invention, whether or not carried out in the presence of a nitrogen atmosphere, requires that the CO partial pressure as generated by one or the other of the following reactions, $$MO_2(s) + 2C(s) = \underline{M} + 2CO(g) \quad \text{or} \tag{1}$$
$$MO_2(s) + 2C(s) + \tfrac{1}{2}N_2(g) = MN(s) + 2CO(g) \tag{2}$$

be maintained below the theoretical equilibrium level as calculated for a given system. In making this partial pressure calculation, and knowing the value of the equilibrium constant ($K_1$ or $K_2$) as well as the activity of the dissolved metal ($a_{\underline{M}}$), the CO partial pressure may be calculated from one or the other of the relationships:

$$K_1 = a_{\underline{M}} \cdot p_{CO}^2 \quad \text{or} \quad K_2 = \frac{p_{CO}^2}{p_{N_2}^{1/2}}$$

where $p_{CO}$ represents the CO partial pressure in atmosphere in one system or the other.

In order to present representative CO partial pressures and $a_{\underline{M}}$ values which are appropriate for use in a practice of this invention, particular information is given below for each of the uranium oxide and titanium oxide systems.

System $UO_2$ in molten Sn

In Table 1 below there are presented values for the equilibrium constant and for $\Delta G°$ in the reaction $$UO_2(s) + 2C(s) = U(l) + 2CO(g) \tag{6}$$

Also shown in Table I are value of $\Delta G°$ and the activity of uranium ($a_U$) in the carbide-forming reactions, $$U(l) + C(s) = UC(s) \tag{7a}$$
$$U(l) + 2C(s) = UC_2(s) \tag{7b}$$

These values, as referred to above, are shown for the three representative operating temperatures 1800° K., 1900° K. and 2000° K.

TABLE I

| Temperature | ΔG° of U(l) reaction (6), cal. | $K_6 = a_U \cdot p_{CO}^2$ | ΔG° of UC reaction (7), cal. | $a_U$ for UC formation |
|---|---|---|---|---|
| 1,800° K | +55,000 | 2.00×10⁻⁷ | −18,000 | 6.3×10⁻³ |
| 1,900° K | +47,500 | 3.40×10⁻⁶ | −17,900 | 9.1×10⁻³ |
| 2,000° K | +40,000 | 4.27×10⁻⁵ | −17,700 | 1.2×10⁻² |

In Table II below there are presented values for the activity ($a_U$) of the uranium dissolved in solution and of the equilibrium partial pressure of CO over the system for these same temperatures at uranium concentrations of 1, 2, 5, 9 and 18 percent by weight in the molten tin solution.

TABLE II

| Temperature | Uranium concentration in tin (wt. percent) | | | | |
|---|---|---|---|---|---|
| | 1% | 2% | 5% | 9% | 18% |
| 1,800° K.: | | | | | |
| $p_{CO}$, atm | 0.045 | 0.037 | 0.022 | 0.019 | 0.018 |
| $a_U$ | 1.0×10⁻⁴ | 4.14×10⁻⁴ | 4.14×10⁻⁴ | 5.4×10⁻⁴ | 5.87×10⁻⁴ |
| 1,900° K.: | | | | | |
| $p_{CO}$, atm | 0.137 | 0.105 | 0.072 | 0.063 | 0.060 |
| $a_U$ | 1.82×10⁻⁴ | 3.1×10⁻⁴ | 6.55×10⁻⁴ | 8.55×10⁻⁴ | 9.3×10⁻⁴ |
| 2,000° K.: | | | | | |
| $p_{CO}$, atm | 0.394 | 0.302 | 0.208 | .182 | .175 |
| $a_U$ | 2.75×10⁻⁴ | 4.68×10⁻⁴ | 9.9×10⁻⁴ | 12.9×10⁻⁴ | 14.0×10⁻⁴ |

It will be seen from the data of Table II above that the activity of the dissolved uranium is in each case less than that given in the Table I for the carbide-forming activity. This holds true at temperatures of 1800° K. for tin solutions having a uranium concentration at least as high as about 25 percent. Moreover, the limiting CO partial pressures presented above are never smaller than about .015 atmosphere, and pressures below this level can readily be maintained over the system by conventional methods.

System TiO₂ in molten Sn

In Tables III and IV below are presented data for the titanium system similar to those presented in Tables I and II above for uranium, the respective thermal reduction and carbide-forming reactions here involved being $$TiO_2(s) + 2C(s) = Ti(l) + 2CO(g) \quad (8)$$

and $$Ti(l) + C(s) = TiC(s) \quad (9)$$

where Ti(l) may represent supercooled titanium liquid. It should be noted that the data presented below are approximate calculations for model systems which serve to demonstrate the principle involved. However, as impurities are present in the feed employed, the actual values of the various numbers shown may change in some degree.

TABLE III

| Temperature | ΔG° of Tl(l) reaction (8), cal. | $K_8 = a_{Ti} \cdot p_{CO}^2$ | ΔG° of TiC reaction (9) cal. | $a_{Ti}$ for TiC formation |
|---|---|---|---|---|
| 1,600° K | +36,050 | 1.1×10⁻⁵ | −39,850 | 0.4×10⁻⁵ |
| 1,800° K | +20,050 | 3.7×10⁻³ | −39,400 | 2.0×10⁻⁵ |

TABLE IV

| | Titanium concentration in tin (weight percent) | |
|---|---|---|
| Temperature | 40% | 50% |
| 1,600° K.: | | |
| $p_{CO}$ | 26.8 atm. | |
| $a_{Ti}$ | 1.3×10⁻⁵ | 3.2×10⁻⁵ |
| 1,800° K.: | | |
| $p_{CO}$ | 721 | |
| $a_{Ti}$ | 7.0×10⁻⁹ | 2.3×10⁻⁵ |

From the above data it will be seen that with this system the CO partial pressures at equilibrium are extremely high and in some cases all that may be required from a CO pressure standpoint is to employ a pressure relief valve to vent the system to the atmosphere. However, these data show that the system must be operated using titanium concentrations in tin below about 50 percent if the activity of the dissolved titanium is to be kept below that at which titanium will form a carbide. Specifically, at 1600° K. the limiting value of the concentration of titanium in solution is about 47 percent by weight, while at 1800° K. the limiting value is about 49 percent.

The nitride-forming reaction step

When the carbothermic reduction reaction of the present invention is conducted at an appropriate temperature and partial pressure of nitrogen, the reaction which takes place may be illustrated by the following equation:

$$MO_2(s) + 2C(s) + \tfrac{1}{2}N_2(g) = MN(s) + 2CO(g) \quad (2)$$

This reaction proceeds to completion only as the carbon monoxide partial pressures are maintained below the equilibrium values. The latter can be determined from the relationship.

$$K_2 = P_{CO}^2 / p_{N_2}^{1/2}$$

wherein $K_2$ can be calculated from known ΔG° values as available in the literature for this reaction. In most instances (assuming the maintenance of nitrogen partial pressures lying in a range of about 0.1 to 1.0 atmosphere which is normally adequate to effect the desired nitride-forming step), the carbon monoxide equilibrium partial pressure may be slightly greater or less than that which characterizes the reaction as conducted in the absence of nitrogen. While both reactions are temperature sensitive (the CO partial pressure rising with temperature), the CO partial pressure in the nitride reaction is not affected by the concentration of the metal in the molten metal solvent.

For example, the following relationships prevail in a system wherein uranium oxide is added to a molten tin solution at the indicated temperatures and wherein the partial pressure of nitrogen is held constant at 1 atmosphere. Here, the reaction proceeds as follows:

$$UO_2(s) + 2C(s) + \tfrac{1}{2}N_2(g) = UN(s) + 2CO(g) \quad (2a)$$

This reaction goes to completion only as the carbon monoxide partial pressures are maintained below the levels shown below in the last column of Table V.

TABLE V

| Temperature | ΔG° of UN reaction (2a), cal. | $K_2 = p_{CO}^2/p_{N_2}^{1/2}$ | $p_{co}$ ($N_2$=1 atm.) |
|---|---|---|---|
| 1,800° K | +23,400 | 1.45×10⁻³ | 3.8×10⁻² |
| 1,900° K | +17,200 | 1.05×10⁻² | 1.0×10⁻¹ |
| 2,000° K | +11,800 | 5.14×10⁻² | 2.2×10⁻¹ |

The approximate corresponding thermodynamic data for the equation, $$TiO_2(s) + 2C(s) + \tfrac{1}{2}N_2(g) = TiN(s) + 2CO(g) \quad (2b)$$

are given below in Table VI.

TABLE VI

| Temperature | ΔG° of TiN reaction (2b), cal. | $K_2 = P_{co}^2/P_{N_2}^{1/2}$ | $P_{co}$ ($N_2$=1 atm.) |
|---|---|---|---|
| 1,500° K | −2,850 | 2.6 | 1.6 |
| 1,600° K | −8,900 | 16.2 | 4.0 |
| 1,700° K | −15,000 | 85 | 9.2 |
| 1,800° K | −20,600 | 316 | 17.8 |

The precise conditions under which any given metal will form a solid nitride product in a given molten solvent metal such as tin may not be available in the literature. However, working at relatively modest nitrogen partial pressures (e.g., 0.1 to 1.0 atmosphere) within a temperature range such as from about 1000° to 2000° K. at which the particular metal nitride is stable, and knowing the equilibrium CO partial pressure value for a given metal at the temperature employed, routine experimentation will enable one skilled in the art to determine the optimum nitride-forming characteristics of any given system as well as those under which the nitride decomposes, with attendant solution of the metal, as nitrogen partial pressures over the system are progressively reduced. For example, at a nitrogen pressure of 1 atmosphere and using tin as the solvent metal, the highly stable uranium nitride compound will not decompose except at temperatures above 2000° K. On the other hand, other nitrides will decompose at lower temperatures, aluminum nitride, for example, decomposing at about 1700° K.

The data provided below concerning the conditions under which uranium nitride components can be formed or decomposed in a molten tin solvent are representative of those which can readily be developed.

Uranium, when dissolved in molten tin (or other appropriate metal) under an atmosphere having a nitrogen partial pressure of the order of at least about 0.02 atmosphere, can exist in the system in part or essentially in whole either as UN or as $U_2N_3$, depending on the temperature and uranium concentration within the system. In general, the solid $U_2N_3$ product is that which is formed at temperatures of about 575° to 1753° K. The UN product is that which is formed at temperatures above about 1758° K., and it is capable of remaining in the system at temperature of 2275° K. or higher under appropriately high nitrogen partial pressures and solution concentrations. The equations for these two reactions are as follows:

$$2\underline{U}+3/2N_2(g)=U_2N_3(s) \quad (10)$$

$$\underline{U}+1/2N_2(g)=UN(s) \quad (11)$$

The two systems do not respond in the same manner to changes of nitrogen pressure. Thus, the UN system is reversible and responds rapidly to pressure change. The $U_2N_3$ system, on the other hand, is not reversible except possibly when it is maintained for long periods of time; specifically, while increasing the nitrogen partial pressure will cause more of the dissolved uranium to precipitate as $U_2N_3$, a lowering of the nitrogen partial pressure is without any substantial effect until pressures are reduced to a very low level, at which point nitrogen gas is evolved and the product is converted to the UN form. If a $U_2N_3$ system is for any reason brought above a level of about 1758° K., it will evolve nitrogen gas and the $U_2N_3$ present will be converted to the UN product. On the other hand, when a UN system is cooled below about 1758° K., the UN material present will be converted to the $U_2N_3$ product. Should insufficient nitrogen be present to effect this transition, a portion of the UN will be converted to $U_2N_3$ while the remainder will dissociate and supply uranium to the molten tin solution. Thus, it is possible to form either a UN or a $U_2N_3$ solid product which can then be separated from the molten tin metal in any convenient fashion. If, however, the solid product is to be decomposed so as to bring the uranium back into the solution, then conditions are preferably chosen which will cast the uranium in the UN form.

As indicated above, the equilibrium characteristics of the $\underline{U}$-Sn-UN system (Equation 11) are such as to permit of a ready shift in either the UN or the $\underline{U}$ direction as nitrogen pressures, temperatures or solution concentration are changed. Thus, for any given concentration of dissolved uranium ($\underline{U}$) in the molten tin or other solvent metal solution, raising the nitrogen pressure or lowering the temperature will tend to increase the relative amount of the precipitated UN which is present. Similarly, the greater the concentration of the $\underline{U}$ in the molten metal, the larger the mass of UN. The significance of the factors of pressure and $\underline{U}$-concentration on the equilibrium state is exemplified by the data presented in the table below for a system maintained at 1823° K.

TABLE VII

| Nitrogen pressure (in atm.) | Kg. uranium precipitated as UN at 1,823° K. from 100 kg. of molten solution of indicated initial weight percent uranium in tin | | | |
|---|---|---|---|---|
| | 18% | 9% | 5% | 2% |
| 1.0 | 15.3 | 8.7 | | ~1.1 |
| 0.9 | 14.8 | 8.6 | | ~0.4 |
| 0.6 | 14.4 | 8.4 | | |
| 0.5 | 14.1 | 8.1 | | |
| 0.4 | 13.3 | 7.7 | | |
| 0.3 | 10.4 | 6.5 | 2.2 | |
| 0.2 | 6.4 | 3.8 | 0.07 | |
| 0.1 | 1.0 | 0.04 | | |

Similarly, the influence of temperature on the equilibrium of a typical $\underline{U}$-Sn-UN system at various nitrogen pressure levels is illustrated by the data presented in Table VIII.

TABLE VIII

| Temperature | Kg. uranium precipitated as UN from 100 kg. of a molten solution of 9% uranium in Sn at indicated nitrogen pressures | | | | |
|---|---|---|---|---|---|
| | .09 atm. | .122 atm. | .16 atm. | .202 atm. | .25 atm. |
| 1,825° K. | .58 | 2.05 | 3.46 | 4.80 | 6.21 |
| 1,840° K. | | 1.05 | 2.48 | 3.92 | 5.46 |
| 1,863° K. | | | 1.38 | 2.82 | 4.21 |
| 1,883° K. | | | | 1.53 | 2.98 |

While the tables given above present illustrative data for particular systems, the following equation (which in contra-distinction to that of Equation 11, wherein the uranium is present in tin solution, is one wherein the system comprises only pure liquid uranium and nitrogen) can be employed to determine any one of the variables affecting equilibrium, i.e., the point at which UN will just begin to precipitate from a given system, when the other variables are held constant. Here we can consider the equation $$UN(s)=U(l)+1/2N_2(g) \quad (12)$$

$$\text{Log } K_{12}=-15{,}600/T+4.7$$

wherein the equilibrium constant $K_{12}=a_U \cdot p_{N_2}^{1/2}$.

For example, the equilibrium pressure of nitrogen required to just initiate UN formation in a 12% solution of uranium in tin at 1873° K. can be determined as follows:

At 1873° K., log $K_{12}=-3.63$; therefore $K_{12}=2.34\times10^{-4}$
At 12% $\underline{U}$ level (mole fraction=0.064) $a_U=0.0008$.
Finally, $2.34\times10^{-4}=0.0008\ p_{N_2}^{1/2}$; therefore $p_{N_2}=0.085$.

Speaking generally, having determined the nitrogen partial pressure which must be maintained over a given solution of a metal in molten tin, or other solvent metal, to form the desired nitride product, one employs the partial pressure value so obtained in the following equation, which relates to reaction (2), to determine the corresponding equilibrium partial pressure of carbon monoxide:

$$K_2=\frac{p_{CO}^2}{p_{N_2}^{1/2}}$$

To make reaction (2) go to completion, the CO partial pressures must be maintained below the equilibrium values so determined.

In carrying out the process of the present invention a variety of refractory construction materials can be employed either to fabricate the equipment or to line the same. The nature of the material chosen depends somewhat on the molten solvent metal to be employed and, while graphite can be employed with essentially any such metal, boron nitride and beryllium nitride can be employed with a tin bath and tungsten with copper or iron. The "skull" technique referred to above can also be employed, in which case the skull will be contained in a cooling unit. A preferred material, particularly when working with uranium oxides, is comprised of graphite or of a refractory such as graphite shielded with alumina. This latter material has good overall strength and the graphite is non-reactive and will readily withstand temperatures ranging from 600° to 2300° K. or even higher, in the absence of oxygen. It is also feasible to fabricate much of the equipment from graphite, a procedure which is particularly well adapted for use in small scale operations wherein the reaction vessel is to be eaten away in some measure so as to supply the reduction reaction with the required amount of carbon.

For a further understanding of the invention as practiced in various of its embodiments, reference may be had to the figures of the drawings wherein.

Figure 1:
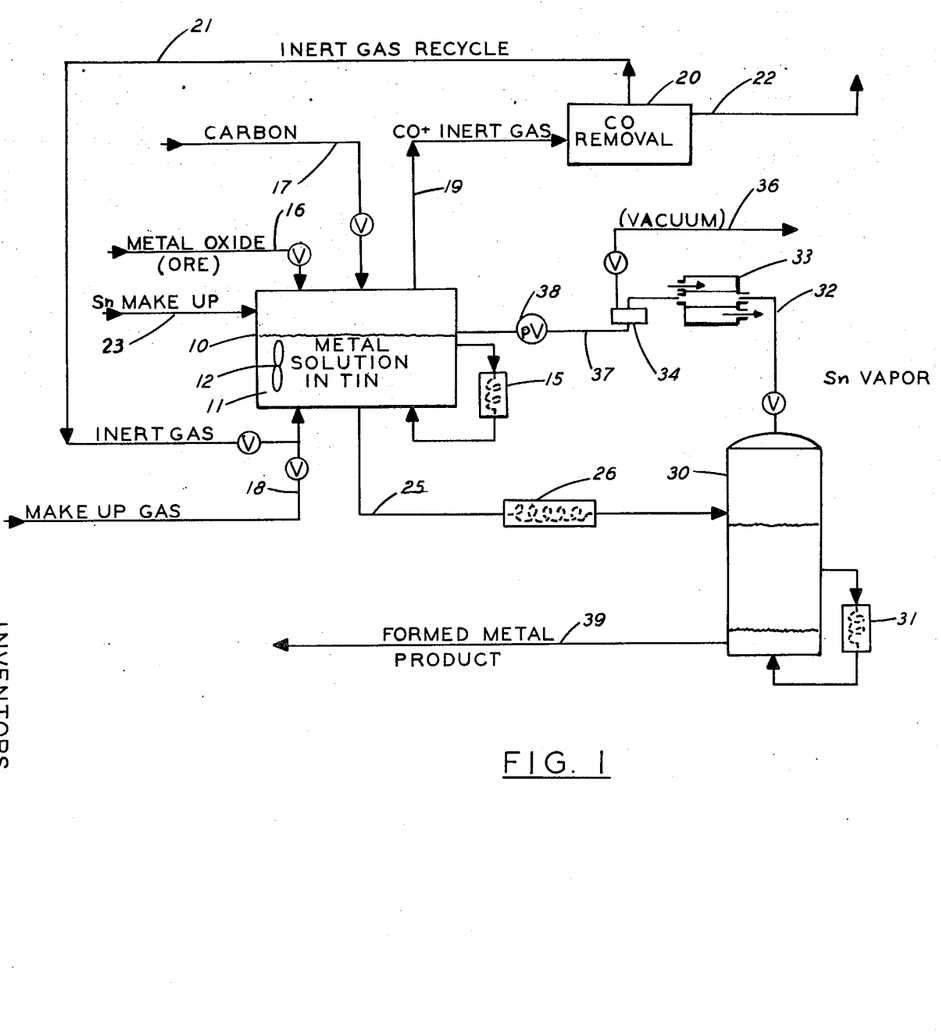
FIG. 1 is a generally schematic view of apparatus adapted to effect carbothermic reduction of metal oxides without the employment of an intermediate, nitride-forming step, the reduced metal being dissolved in a molten tin bath from which the tin can thereafter be distilled off.

Referring more particularly to FIG. 1, there is shown a reactor vessel 10 containing a molten bath 11 of tin, said bath being mixed by a stirring device 12 and maintained at the desired temperature as the tin is recycled through an electrical induction heater 15. The metal oxide feed component is supplied to the reactor vessel 10 through a line 16, while the carbon necessary to react with the oxygen of the oxide to form carbon monoxide is added through line 17. In order to maintain the partial pressure of the carbon monoxide formed in the reduction reaction below equilibrium levels, an inert gas such as argon or helium is injected into the body of molten tin through line 18, said gas serving to sweep the carbon monoxide out of the system through line 19 and also to agitate the molten metal solution. In an alternate method (not shown) the desired CO partial pressure can be provided and maintained by use of a vacuum. This exit gas line 19 passes to a gas clean-up zone 20 adapted to remove the carbon monoxide, thus leaving the inert gas which is then recycled back to the unit through line 21 along with any required makeup gas as supplied through the line 18. Removal of the carbon monoxide in zone 20 can be effected in any conventional fashion such, for example, as by oxidizing the gas to carbon dioxide which can then be absorbed or condensed for discharge through line 22. A tin make-up line is shown at 23.

When the amount of reduced metal present in solution in the tin bath 11 builds up to the desired level, e.g., 20 to 30% by weight, further addition of metal oxide and carbon is discontinued, and the solution present in vessel 10 is then passed through line 25 to an induction heating unit 26 and from thence to a distillation column 30 from which the tin is distilled off. This column is provided with an induction heated reboiler 31 and is operated under reduced pressures. The heat can also be supplied by use of an electron beam heating device. Tin vapors are taken overhead from column 30 through a line 32 for passage to a heat exchanger 33 where the vapors are condensed to liquid form. The liquid tin then passes to a collection tank 34 provided with a vacuum line 35 whereby the desired pressure can be established in column 30, in line 32 and condenser 33, and over the condensed liquid in tank 34. The molten tin flows from the latter tank via line 37 and pressure relief valve 38 to the vessel 10. After the tin has been distilled off, the desired residual metal can be withdrawn from column 30 through a line 39.

Figure 2:
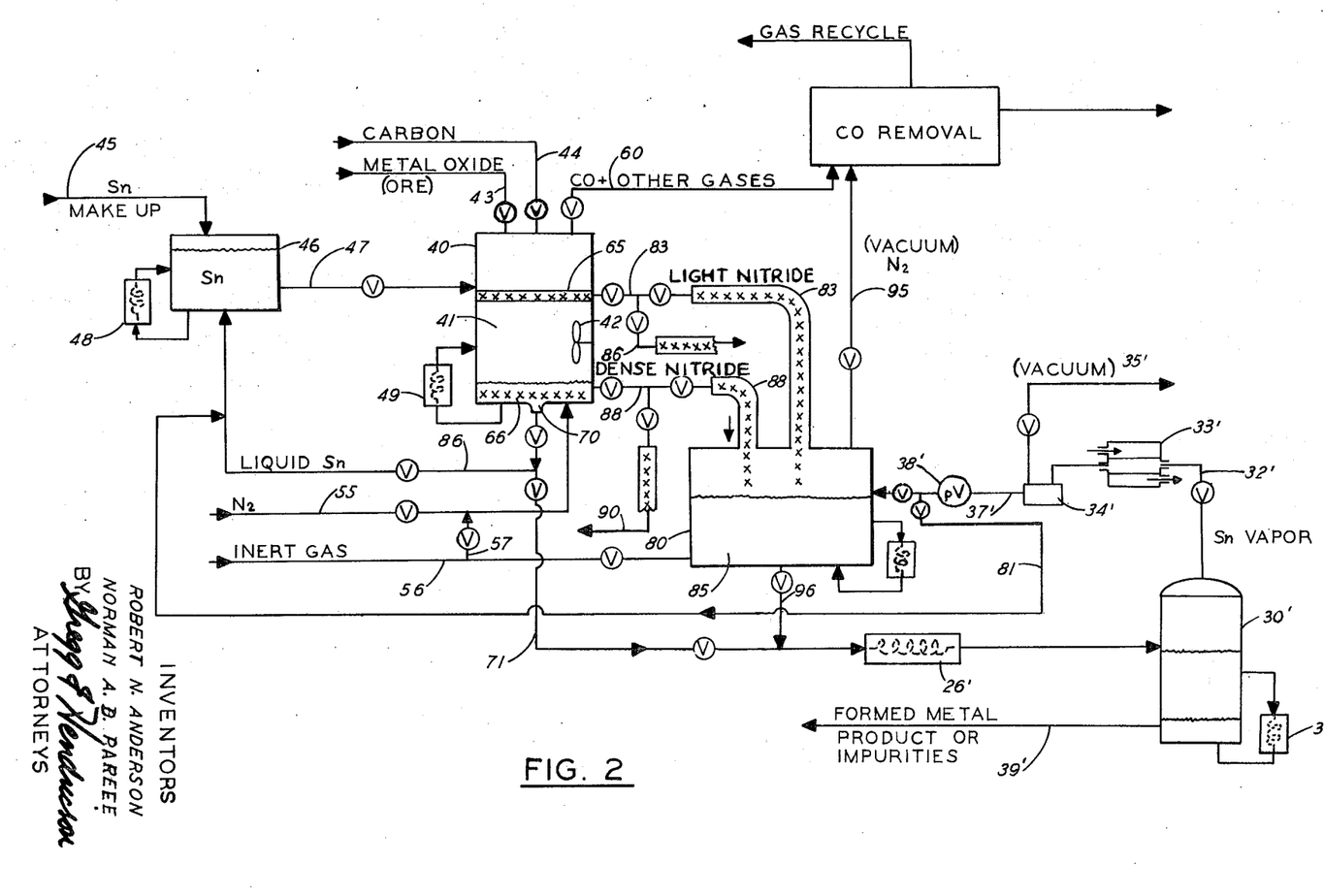
FIG. 2 is a view, also schematic in nature, of a system wherein the carbothermic reduction step is accompanied by the simultaneous formation of a solid metal nitride product which can either be recovered as such or converted in the presence of a molten metal solvent to nitrogen gas and to pure metal which dissolves in the metal solvent for subsequent recovery.

Referring now to FIG. 2 of the drawings there is shown a reaction vessel 40 containing a molten body 41 of tin adapted to be stirred by an agtitator 42. The metal oxide feed is supplied to vessel 40 via line 43, while carbon is supplied through line 44. In some cases, natural gas or scrap organic matter can be used in place of a pure carbon source. The molten tin is supplied as required through line 45 to a reservoir 46 from which the tin can be transferred to vessel 40 through line 47. The tin held in reservoir 46 can be maintained at the desired temperature as the molten metal is recycled through a heater 48 of the induction type. Similarly, vessel 40 is provided with a recycle induction heater 49.

As the metal oxide and carbon are supplied to vessel 40, nitrogen gas is brought into the tin melt through line 55. If desired, the nitrogen stream entering the melt may be admixed with an inert gas such as argon, helium or the like as supplied to the nitrogen line through lines 56 and 57. Unreacted nitrogen gases, along with carbon monoxide formed during the reduction reaction and any inert gas employed, are withdrawn from the vessel 40 through line 60. In the ensuing reaction which takes place in vessel 40 the metal oxide reacts to form an insoluble metal nitride product. If said nitride product is less dense than the tin melt it will float thereon as indicated at 65. On the other hand, any nitride product more dense than the melt will sink to the bottom as indicated at 66. Occasionally the system will contain both a layer 65 and a layer 66, this being the case when, for example, the ore or other oxide feed contains oxides of different metals one of which floats on the tin when in nitride form while the other sinks. Again, the metal oxide may contain contaminant metals which may react with nitrogen in some measure to form a nitride product which appears in a different layer than the principal metal nitride product.

Once the nitride formation step is complete, the solid nitride product(s) may be removed from the tin melt 41 and from vessel 40 in any convenient fashion. Alternatively, said nitrides may be converted in situ in vessel 40, in the presence of the molten tin 41, to nitrogen gas and to essentially pure metal which goes into solution in said tin.

When the latter, in situ conversion is to be effected, the flow of nitrogen and of the other feed streams to the vessel 40 is cut off and the nitrogen partial pressure over the melt 41 is reduced. This can be accomplished either by pulling a vacuum through line 60, thereby taking off the evolved nitrogen gas, or merely by passing an inert gas through the melt and out line 60, thereby sweeping out the evolved nitrogen gas without having to reduce the overall system pressure. Once the conversion is complete, the solution of the metal in the motlen tin can be withdrawn through filter 70 for passage via line 71 incorporating an induction heater 26' to a distillation column 30' equipped with a recycle induction heater 31'. From column 30' the vaporous tin is taken overhead through a line 32' to a condenser 33' while the residual metal product can be withdrawn via line 39'. The molten tin which forms in the condenser then passes to a liquid collection tank 34' which is provided with a vacuum line 35', whereby the desired reduced pressure may be established in column 30', line 32 and tank 34'. The tin can flow from the latter tank either to vessel 80 via line 37' incorporating a pressure relief valve 38′, or through lines 37′ and 81 as a species of recycle stream back to the reservoir 46.

When it is desired to remove the solid nitride product layer 65 from vessel 40 rather than convert the same in situ therein as described above, this can be accomplished by discharging said product through a line 83, the discharged material either being directed into a fresh bath 85 of molten tin contained in vessel 80 or else taken off through line 86 for recovery in nitride form. In another mode of operation, the nitride layer 65 can be brought down to the position shown for the layer 66 by draining the liquid tin out of vessel 40 through filter 70, said tin then being either returned to reservoir 46 via lines 71 and 86 or directed through line 71 into column 30′ for distillation. In the latter mode of operation, impurities present in the tin as introduced with the metal oxide feed can be drawn off from column 30′ through the line 39′.

The statements made above as to available modes of operation when drawing off the solid nitride product 65 from vessel 40 also apply in large measure when the nitride layer to be recovered is the relatively more dense solid shown at 66. Here the said solid can be separated by mechanical means (not shown) and taken either to the vessel 80 via line 88 or out of the system through line 90. This separation of the product 66 can be facilitated, if desired, by first draining the molten tin out of vessel 80 through filter 70 and line 71, leaving only the solid product in the vessel for transport either to vessel 80 or out of the system.

When one or the other of the solid nitride products 65 or 66 is directed into the bath of clean molten tin 85 in vessel 80, the conversion of the nitride to nitrogen gas and metal, which then dissolves in the tin, can be effected in said vessel either by drawing a vacuum over the tin melt through line 95 or by passing an inert gas from line 56 through the melt, said gas then being discharged through line 95 along with the evolved nitrogen gases. The resulting solution of the metal in the molten tin can be discharged through lines 96 and 71 to the distillation column 30′ for processing in the same general fashion as described above in connection with a similar stream as formed in situ in vessel 40 and then discharged through line 71. However, in the present operation, wherein an essentially pure nitride solid from vessel 40 is introduced into the clean melt 85 of tin, the metal product stream taken off from column 30′ through line 39′ will be in a high state of purity. Still higher purification could be achieved, if required, by proceeding through a second metal nitride-forming step, with the relatively more pure solid nitride so formed then being recovered and converted to metal form in still another bath of pure molten tin.

In discussing the separation of the pure metal formed in the present process from a bath of molten tin in which said formed metal is dissolved, the method exemplified above is to distill off the tin from the solution, preferably under high vacuum. Conversely, certain metals may also lend themselves to being the solution component which is distilled off from the molten solvent metal.

Further, other phase separation techniques can also be used. A good liquid-liquid separation method, for example, is that which can be employed in connection with a solution of uranium in molten tin. The addition of magnesium metal to this solution results in the formation of a molten tin-magnesium phase which can then be physically separated from the molten uranium phase.

Another phase separation technique, applicable to a system in which titanium is the reactive metal because of the stable hydride forming properties of titanium, includes the cooling of the mix after the above reduction reaction to a temperature below that at which TiH decomposes (e.g., 600° K.) and providing a hydrogen-containing atmosphere over the melt at a hydrogen pressure sufficient to induce the metal formed to combine with hydrogen. The formed TiH, which floats on the solvent metal may be skimmed off and converted to metallic titanium powder by heating the hydride in vacuo at temperatures above about 1400° K.

Another phase separation technique relies upon the inherent solubility properties of the system as exemplified in a flow diagram. For example, in a system of aluminum as the reactive metal and tin as the molten metal solvent, the temperature may be lowered to precipitate aluminum while retaining tin in solution. A suitable temperature range for this purpose is on the order of 510–600° K.

It is noted that the aluminum activity in tin is low enough as to avoid significant carbide formation without the production of inter-metallic compounds. This is in marked contrast to the aforediscussed general case of stable oxide systems in which inter-metallic compounds are formed to avoid carbide formation.

In the interests of simplicity and clarity of expression, various conventional items of equipment such as pumps, instrumentation, mechanical accessories and various valves and the like have been omitted from the essentially schematic flow schemes presented in the drawings.

It will be obvious that the invention permits of many variations to adapt the method thereof to the processing of particular oxide feed stocks and to ores of varying degrees of purity. It is also possible to use as the feed not only oxides but also metals which are contaminated with oxides or with dissolved oxygen and which may also contain various metallic contaminants. For example, titanium scrap containing titanium along with titanium oxide and bits of steel can be employed as the feed to the molten tin bath along with carbon in an amount sufficient to react with the oxygen present in the scrap to form carbon monoxide. In dealing with feed stocks of this nature wherein the added metal contains small amounts of other metals, the operation preferably proceeds through a nitride-forming stage, with the solid nitride product so formed from the principal metal then being separated out and converted to pure metal in a clean bath of tin. The tin present in the original reactor bath can be recycled until impurities therein build up to a level where distillation of the tin therefrom becomes advisable.

The nitride-forming, metal separation method which is referred to in the preceding paragraph, as well as elsewhere herein, is a feature of the present invention of broad application. For example, it can be used even when dealing with feed compositions containing a plurality of reactive metals which are to be separated from one another, or with those containing one or more reactive metals along with other metals, e.g., gold, silver or platinum, which do not readily form stable carbides or nitrides and are thus not classed herein as "reactive" metals. In referring to "metal' feed components, both here and in the claims, it is intended to include free metals as well as those wherein the metal is present in compound or alloy form.

It should also be noted that the nitride-forming metal separation method hereof has utility both in connection with feed compositions wherein the reactive metal to be converted to a nitride is present in the oxide form (in which event carbon will also be present as a reactant), as well as with those which are essentially or even entirely free of reactive metal oxide components, in which event little if any carbon need be supplied to the system. An exemplary separation method of the latter character is one wherein the feed composition is made up of silver or other noble metal contaminated with minor amounts of actinide or lanthanide metals. Here the composition can either be added to a molten tin solvent, for example, or in the case of a composition rich in silver the silver component thereof can itself serve as the molten metal solvent of the system either alone or admixed with tin. In any event, a nitrogen-containing atmosphere is established over the melt to induce separation of the actinide or lanthanide components as they are converted to insoluble nitrides. On separating off these nitrides the noble metal can then be recovered in a form free of actinide-lanthanide contamination. The separated nitride product(s) can either be discarded as waste, or, on being added to a fresh tin or other molten solvent metal, they can be converted to nitrogen and free metal present in solution as the nitrogen pressure over the system is reduced.

The invention also contemplates a method of operation wherein the feed metal is added to the melt in carbide rather than oxide form. Carbides of this character can readily be prepared outside the system by ane one of several methods known to the art as by prereducing a reactive metal oxide (e.g., $Al_2O_3$) with carbon. In this method of operation, and in a system wherein the activity of the added metal is reduced to a level below that at which the metal can exist as a carbide, in accordance with the principles of the present invention, it is found that the metal carbide added to the molten tin or other solvent metal readily decomposes. The carbon component of the compound is thereby released in particulate form, while the metal component of the added carbide goes into solution in the molten solvent.

Still other modifications of the invention hereof will suggest themselves to those skilled in the art.

What is claimed is:

1. A carbothermic method for the reduction of an oxide of a reactive metal capable of reacting with carbon to form the corresponding metal carbide, which comprises the steps of reacting said oxide with carbon or a carbon source material in excess of stoichiometric requirements at temperatures above about 600° K. in a molten metal solvent which lowers the activity of the reduced reactive metal formed during the reduction reaction to a level below that required for said reactive metal to form a carbide under the reaction conditions prevailing in the system and increase the carbon monoxide partial pressure threshold, said molten metal solvent being capable of forming stable inter-metallic compounds with the reactive metal, and maintaining the partial pressure of the carbon monoxide present over the reaction mixture at a level below the equilibrium value for said reaction mixture as the reduction of the metal oxide takes place.

2. The method as recited in claim 1 in which said reactive metal is selected from the group consisting of niobium, tantalum, plutonium, uranium, zirconium, hafnium, titanium, boron, magnesium, chromium, manganese, vanadium, silicon, aluminum, beryllium, and mixture and alloys thereof.

3. The method as recited in claim 1 in which said molten metal solvent is selected from the group consisting of lead, zinc, bismuth, cadmium, silver, tin, copper, iron and mixtures and alloys thereof.

4. The method as recited in claim 1 wherein the molten metal solvent is selected from a group consisting of tin, copper and iron.

5. The method as recited in claim 4 wherein the molten metal solvent is tin.

6. The method as recited in claim 1 wherein reactive metal is formed during the reduction reaction in the molten metal solvent and said reactive metal is recovered by separating the same from said molten metal solvent.

7. The method as recited in claim 1 wherein the reactive metal is removed from the molten solvent by a phase separation technique.

8. The method as recited in claim 1 wherein a nitrogen-containing atmosphere is maintained over the molten metal solvent having a nitrogen partial pressure sufficient to combine with any reduced reactive metal to form an insoluble nitride product which is precipitated in a separate phase.

9. The method as recited in claim 8 wherein the nitrogen-containing atmosphere is maintained during the reduction reaction so that the insoluble nitride is formed as the reduction of the metal oxide is taking place.

10. The method as recited in claim 8 wherein the nitrogen-containing atmosphere is maintained after reduction to the metal alloy takes place.

11. The method as recited in claim 8 wherein the insoluble nitride formed is a uranium nitride and wherein the molten metal solvent is tin.

12. The method as recited in claim 8 wherein the insoluble nitride formed is a titanium nitride and wherein the molten metal solvent is tin.

13. The method as recited in claim 8 wherein the insoluble metal nitride formed during the reaction is converted in the presence of a molten metal solvent to nitrogen gas and to metal which is dissolved in said solvent metal, said conversion being effected by maintaining the partial pressure of nitrogen in the system below equilibrium levels as the nitride is progressively converted; and wherein the metal dissolved in the molten metal solvent is recovered by separating the same from said solvent.

14. The method as recited in claim 13 wherein the solvent metal is tin, the insoluble metal nitride is UN and the metal recovered is uranium.

15. The method as recited in claim 13 wherein the solvent metal is tin, the insoluble metal nitride is titanium nitride and the metal recovered is titanium.

16. The method as recited in claim 8 wherein the insoluble nitride product is physically separated from the remaining, liquid portions of the system, wherein the separated nitride is then added to a fresh, relatively clean bath of a molten metal solvent, wherein the nitride so added is converted to nitrogen gas and to metal which dissolves in said metal solvent, and wherein the dissolved metal is recovered by distilling off the metal solvent from the solution.

17. The method as recited in claim 7 in which a phase separation is accomplished after formation of the metal in the reduction reaction by providing a hydrogen-containing atmosphere over the molten metal solvent having a hydrogen partial pressure sufficient to induce the reduced metal to combine with hydrogen at a temperature below that at which the reactive metal hydride decomposes to form an insoluble hydride product.

18. The method as recited in claim 17 in which the insoluble hydride formed is titanium hydride which floats on the melt and the molten metal solvent is tin.

19. A method as recited in claim 1 for separating a reactive metal from a feed composition containing an oxide of the reactive metal and at least one other non-reactive metal that does not readily form carbides or nitrides and which is soluble in the molten metal solvent, said method comprising forming a melt of a molten metal solvent which incorporates the said feed composition together with carbon or carbon source material in excess of stoichiometric requirements to react with said reaction metal oxide, said solvent being one which does not readily form nitrides; maintaining a nitrogen-containing atmosphere over the melt having a nitrogen partial pressure sufficient to induce said reactive metal to combine with nitrogen to form nitride product insoluble in the melt; and separating said nitride product from the melt.

20. The method as recited in claim 19 wherein said non-reactive metal comprises molten noble metal and said reactive metal is selected from the group consisting of actinide and lanthanide metals.

21. The method as recited in claim 19 wherein tin is employed as the molten metal solvent.

22. The method as recited in claim 21 wherein the noble metal component of the residual tin melt is recovered by distilling off the tin.

23. A carbothermic method for the reduction of aluminum oxide which comprises reacting said oxide with carbon in excess of stoichiometric requirements at temperatures above about 600° K. in molten tin and maintaining the partial pressure of the carbon monoxide present over the reaction mixture at a level below the equilibrium value for said reaction mixture as the reduction of the metal oxide takes place.

24. A method as in claim 23 in which after said reaction, the temperature of the reactive mixture is lowered sufficiently to precipitate the aluminum while retaining tin in solution.

References Cited

UNITED STATES PATENTS

| | | | |
|---|---|---|---|
| 3,637,370 | 1/1972 | Baker | 75—84 |
| 3,597,192 | 8/1971 | Wilhelm et al. | 75—84 |
| 2,992,095 | 7/1961 | Li | 75—27 |

FOREIGN PATENTS

| | | | |
|---|---|---|---|
| 123,113 | 2/1919 | Great Britain | 75—27 |

CARL D. QUARFORTH, Primary Examiner

B. HUNT, Assistant Examiner

U.S. Cl. X.R.

75—67, 68 A, 80, 84, 84.1 R; 423—350